Nov. 10, 1970 C. P. GERRARD 3,539,929

PULSE DISCRIMINATION CIRCUIT

Filed Oct. 17, 1966

INVENTOR.
CHARLES P. GERRARD

BY

Christie, Parker & Hale

ATTORNEYS

United States Patent Office 3,539,929
Patented Nov. 10, 1970

3,539,929

PULSE DISCRIMINATION CIRCUIT

Charles P. Gerrard, Pasadena, Calif., assignor to Burroughs Corporation, Detroit, Mich., a corporation of Michigan Filed Oct. 17, 1966, Ser. No. 587,089
Int. Cl. H03k 5/20
U.S. Cl. 328—115 9 Claims

ABSTRACT OF THE DISCLOSURE

Pulses to be discriminated are applied to one input of a differential comparator. A source of strobe pulses is applied through a diode to the other input of the differential comparator. Between strobe pulses the diode is forward biased, thereby holding the input of the differential comparator at a voltage level that exceeds the maximum voltage of the pulse signal to be discriminated. Upon the occurrence of a strobe pulse, the diode is back-biased, thereby coupling a threshold level voltage to the second input of the differential comparator.

This invention relates to pulse discrimination and, more particularly, to circuitry especially suitable for use in the recovery of binary information from core memories.

In recovering binary information from core memories, it is common practice to discriminate both as to signal amplitude and as to time. A marked improvement in the signal-to-noise ratio of the recovered signal is effected by such a double discrimination. Conventionally, the recovered signal first undergoes amplitude discrimination. The resulting signal assumes one of two states depending upon whether the recovered signal is above or below a threshold value, which is usually adjustable. After amplitude discrimination, time discrimination takes place under the control of strobe pulses. Thus, the time-discriminated signal assumes one of two state depending upon the state of the amplitude-discriminated signal during the strobe interval. To achieve, in fact, the best possible signal-to-noise ratio, the phase relationship between the strobe pulses and the signal to be time-discriminated is critical. If the signal is strobed too early or too late, either the noise is unduly large or the signal unduly small. Inherent in the amplitude-discrimination operation, however, are variable time delays, which introduce uncertainty as to the relative phase of the signal to be time-discriminated. This tends to diminish the improvement in signal-to-noise ratio attained by double discrimination.

In contrast, the invention contemplates combining time and amplitude discrimination of pulse signals in a single operation. A differential comparator is provided having two inputs and an output that is capable of assuming one of two states, depending upon the relative magnitude of the signals applied to the two inputs. The signal to be discriminated is coupled to one input, while a signal sufficient in magnitude to hold the output of the differential comparator in a first state is normally coupled to the other input. Responsive to the apparance of strobe pulses, a signal representing a threshold level is coupled to the other input. If the signal to be discriminated exceeds this threshold level, the output of the differential comparator changes to a second state. Otherwise, it remains in the first state during the strobing interval. Since time and amplitude discrimination are both accomplished in the same operation, the variable time delays inherent in amplitude discrimination do not affect the phase relationship between the signal to be discriminated and the strobe pulses.

Figure 1:
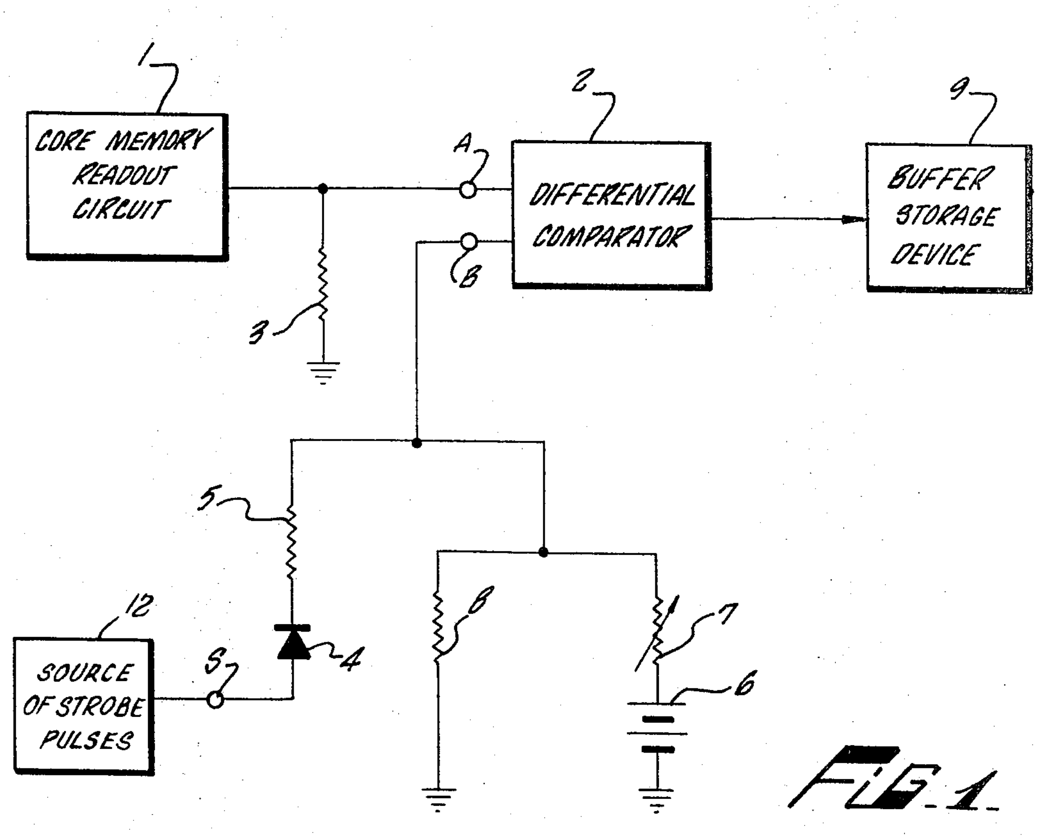
Figure 2:
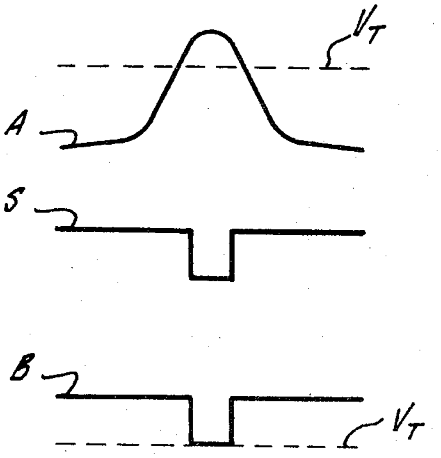

These and other features of the invention are considered further in the following detailed description taken in conjunction with the drawings, in which:

FIG. 1 is a schematic diagram partially in block form of circuitry embodying the principles of the invention; and FIG. 2 represents wave forms appearing at certain points in the circuitry of FIG. 1.

In FIG. 1 core memory read-out circuitry is represented by a block 1. In general, block 1 could be any source of pulse signals to be discriminated. Specifically, this circuitry could be, for example, the apparatus disclosed in my copending application entitled "High Speed Core Memory with Low Level Switches for Sense Windings," Ser. No. 511,738, filed on Dec. 6, 1965, and assigned to the same assignee as the present application, which matured into Pat. 3,501,751 on Mar. 17, 1970. In such case, the output of block 1 would be the differential amplifier designated 34 in my above-mentioned copending application. The output of block 1 is coupled to an input terminal A of a differential comparator 2. A resistor 3 is connected between the output of block 1 and ground. A terminal S, which is the output of a source of strobe pulses 12, is connected by a diode 4 and a resistor 5 to an input terminal B of differential comparator 2. The strobe pulses are derived from a master clock, which also controls the recovery of the information from the core. Consequently, the strobe pulses bear a fixed predetermined phase relationship to the signal to be discriminated. The threshold level for the signal to be discriminated is set by a battery 6 connected through a potentiometer 7 to terminal B and a resistor 8 connected between terminal B and ground. The threshold level is adjusted by varying the slider arm of potentiometer 7. Differential comparator 2, which is a commercially available circuit, has an output that assumes one of two states, for example, a binary "1" or "0," depending upon the relative magnitude of the signals applied to terminals A and B. If terminal A becomes positive with respect to terminal B, the output of differential comparator 2 would assume, for example, a "1" state. Otherwise it would remain in a "0" state as long as terminal A is negative with respect to terminal B. The output of differential comparator 2 is coupled to a buffer storage device 9 which could, for example, produce a pulse of fixed duration each time the output of differential comparator 2 assumes the "1" state.

In conjunction with the description of the mode of operation of the circuitry of FIG. 1, reference is made to the wave forms of FIG. 2 labeled A, S, and B, which correspond to the signals appearing at terminals A, S, and B, respectively. The signal applied to terminal S outside of the strobe intervals in sufficiently positive so that diode 4 is forward-biased. Resistor 5 is selected to be of such value that the resulting signal at terminal B during this time interval is larger than the maximum magnitude that the signal at terminal A attains. Thus, outside of the strobe interval, the signal applied to terminal S overrides the threshold level and makes it ineffective; as a result, terminal A is always negative with respect to terminal B and the output of differential comparator 2 is in the "0" state. During the strobe interval, the signal at terminal S assumes a value sufficient for diode 4 to become back-biased and the signal applied to terminal B, which is determined by the voltage of battery 6 and the resistance of potentiometer 7 and resistor 8, assumes a threshold value, designated $V_T$ in FIG. 2. Consequently, the output of differential comparator 2 changes to state "1" if the signal applied to terminal A exceeds the threshold value $V_T$ during the strobe interval. Otherwise, the output of differential comparator 2 remains in the "0" state.

What is claimed is:

1. A pulse discrimination circuit comprising: a source of signals to be discriminated, means having first and second inputs for generating a binary output signal the state of which depends upon the relative magnitudes of the signals applied to the first and second input terminals, a source of strobe pulses, means for coupling the source of signals to be discriminated to the first input terminal, means in the absence of strobe pulses for applying to the second input terminal a holding signal of sufficient magnitude to hold the output of the binary output signal generating means in a first state regardless of the magnitude of the signal to be discriminated, and means responsive to each strobe pulse for applying to the second input terminal a reference signal representing a fixed threshold level for the signal to be discriminated such that the binary output signal generating means changes from the first to a second state when the signal to be discriminated exceeds the threshold level.

2. The pulse discrimination circuit of claim 1, additionally comprising a source of strobe pulses the output of which between successive strobe pulses assumes a potential that is greater than the holding signal and during each strobe pulse assumes a potential that is smaller than the reference signal, the means for applying to the second input terminal a holding signal comprising a diode connected between the source of strobe pulses and the second input terminal, the diode being poled to be forward-biased between successive strobe pulses and back-biased during each strobe pulse, and the means for applying to the second input terminal a reference signal comprising a source of a fixed direct-current voltage connected between the second input terminal and ground.

3. The pulse discrimination circuit of claim 2, in which the source of fixed direct-current voltage is connected between the second input terminal and ground by a variable resistor.

4. The pulse discrimination circuit of claim 3, in which a resistor is connected between the first input terminal and ground.

5. The pulse discrimination circuit of claim 4, in which a resistor is directly connected between the second input terminal and ground.

6. The pulse discrimination circuit of claim 10, in which a resistor is connected in series with the diode between the second input terminal and the source of strobe pulses.

7. A pulse discrimination circuit comprising:

a core memory readout circuit providing binary signals to be discriminated between a first binary value and a second binary value;

a differential comparator having first and second input terminals and an output terminal that assumes one or the other of two binary states depending upon the relative magnitudes of the signals applied to the first and second input terminals;

means for connecting the core memory readout circuit to the first input terminal of the differential comparator;

a source of fixed direct current reference voltage representing a threshold level for discrimination of the signal appearing at the core memory readout circuit;

a variable resistor connecting the source of reference voltage to the second input terminal, the threshold level varying as a function of the setting of the variable resistor;

a source of strobe pulses having an output outside strobe intervals that assumes a magnitude larger than the maximum value the signal at the core memory readout circuit assumes and during each strobe interval that assumes a magnitude below the magnitude of the reference voltage; and a diode connecting the source of strobe pulses to the second input terminal, the diode being poled so it is forward-biased outside of the strobe interval and is back-biased during the strobe intervals.

8. The pulse discrimination circuit of claim 7, in which a resistor is connected between the first input terminal and ground.

9. The pulse discrimination circuit of claim 7, in which a resistor is connected between the second input terminal and ground.

References Cited

UNITED STATES PATENTS

| | | | |
|---|---|---|---|
| 3,317,753 | 5/1967 | Mayhew | 307—235 |
| 3,248,570 | 4/1966 | Gaunt | 307—235 |
| 3,280,346 | 10/1966 | Schoute | 307—235 |

DONALD D. FORRER, Primary Examiner

D. M. CARTER, Assistant Examiner

U.S. Cl. X.R.

307—232, 235; 328—146